Oct. 29, 1946.                    L. F. BEACH                          2,410,039
                        MAGNETIC FIELD RESPONSIVE DEVICE
                         Filed July 31, 1941            2 Sheets-Sheet 1
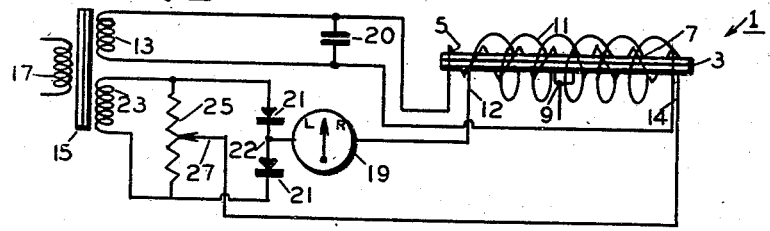
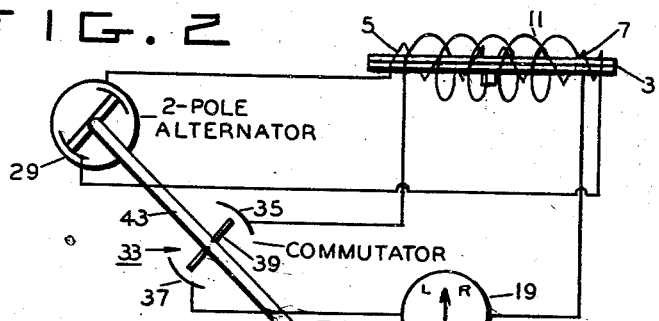
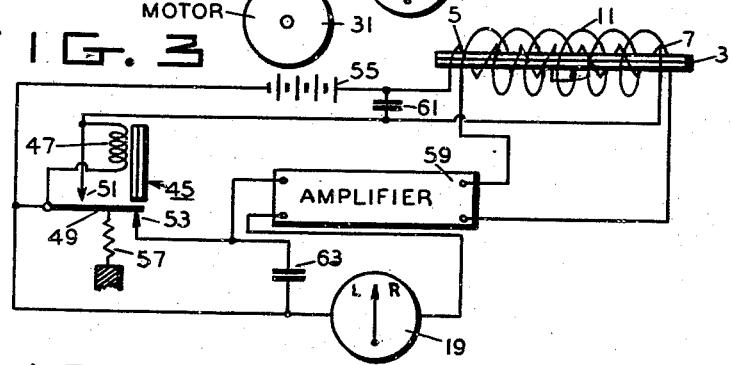
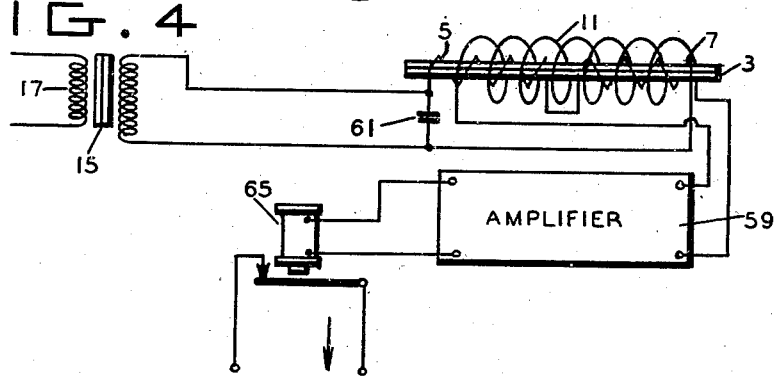
TO INDICATOR
OR CONTROL CIRCUIT
INVENTOR
LENNOX F. BEACH
BY
Herbert H. Thompson
HIS ATTORNEY Oct. 29, 1946.  L. F. BEACH  2,410,039
MAGNETIC FIELD RESPONSIVE DEVICE
Filed July 31, 1941  2 Sheets-Sheet 2
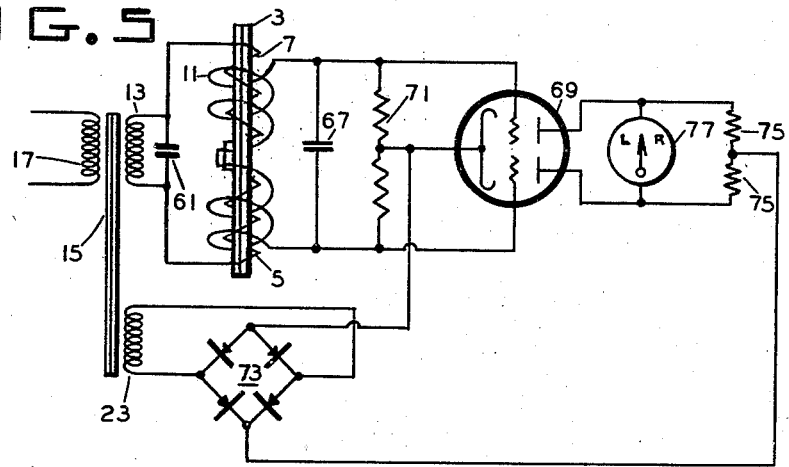
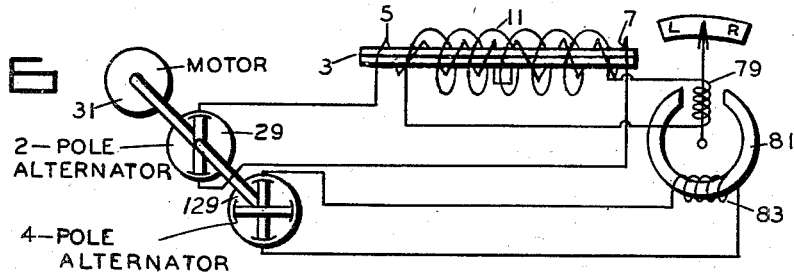
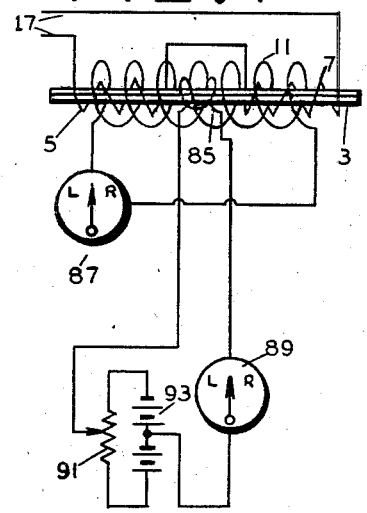
INVENTORS
LENNOX F. BEACH
BY
Herbert H. Thompson
HIS ATTORNEY Patented Oct. 29, 1946

2,410,039

UNITED STATES PATENT OFFICE 2,410,039

MAGNETIC FIELD RESPONSIVE DEVICE

Lennox F. Beach, Merrick, N. Y., assignor to The Purves Corporation, Springfield, Mass., a corporation of Massachusetts Application July 31, 1941, Serial No. 404,809

13 Claims. (Cl. 175—183)

This invention relates to magnetic field responsive devices, especially of the type shown in Patent No. 2,047,609, issued July 14, 1936, to Haig Antranikian. As therein explained, such devices operate on the principle of a magnetic core whose reluctance is periodically varied by a periodically varying energizing magnetomotive force and which will respond to fixed or varying external magnetomotive forces to yield a periodic output current or voltage whose phase will correspond to the polarity or direction of the external magnetomotive force, and whose magnitude will correspond to the instantaneous intensity of the magnetomotive force.

The present invention is concerned with improvements on the type of device shown in the above patent, and adaptations of this improved device to uses such as magnetic field direction and/or sense indicators, magnetic field intensity indicators, and magnetic field responsive devices.

It is accordingly an object of the present invention to provide an improved indicator for the direction and/or sense of a magnetic field such as the earth's field.

It is another object of this invention to provide an improved device for determining the instantaneous intensity of a fixed or varying magnetic field.

It is a further object of this invention to provide an improved relay device responsive to a magnetic field.

Other objects and advantages will become apparent from the specification, taken in connection with the accompanying drawings wherein the invention is embodied in concrete form.

In the drawings,

Figs. 1 to 3 are schematic diagrams of devices for indicating the direction and intensity of magnetic fields;

Fig. 4 is a schematic diagram of a relay device responsive to magnetic fields;

Figs. 5 and 6 are modifications of the devices of Figs. 1 to 3; and

Fig. 7 is a schematic diagram of a magnetic field intensity measuring device.

Fig. 1 shows a device for indicating the orientation and instantaneous intensity of a fixed or varying magnetic field. A magnetic pick-up device 1 has a core 3 upon which are wound identical primary coils 5, 7. These coils are connected in series, as at 9, and are wound so as to create opposing magnetomotive forces and fluxes in core 3. Also wound on core 3 and preferably concentric with coils 5, 7 is a secondary coil 11.

The primary windings may be energized by any periodically varying current and are illustrated as being energized by alternating current from secondary winding 13 of power transformer 15 whose primary 17 is connected to any suitable source of alternating current. It is to be understood that the terminals of winding 5, 7 may be connected to any source of periodically varying voltage. Secondary 11 and primaries 5, 7 are so arranged that, in the absence of any external magnetic field components along core 3 (as when the core points East and West if the earth's magnetic field is used), no voltage is induced in secondary 11. This adjustment may be performed by making coil 11 slidable along coils 5, 7.

A suitable construction for this pick-up device is shown in my copending application Serial No. 348,582 for Direction indicator for magnetic fields, filed July 30, 1940, and which matured on August 28, 1945 into U. S. Patent No. 2,383,459. Alternatively, core 1 may be formed in two separate but adjacent sections, each section having a primary winding such as 5 or 7 and half of the secondary winding 11, the two secondary halves being series-connected, to provide a voltage thereacross which is produced through interaction between the device and the external field, the primary windings being preferably series-connected.

One terminal 12 of secondary 11 is connected to one side of direct zero-center meter 19 whose other terminal is connected to the junction 22 of two series connected rectifiers 21. These rectifiers may be of any desired type, such as chemical, electrical, etc. The rectifiers 21 are connected in series across another secondary 23 of supply transformer 15. When a different source of periodically varying voltage is used, the terminals of rectifiers 21 may be connected directly thereacross.

Also connected across this secondary 23 is a potentiometer resistor 25, whose variable arm 27 is connected to the other terminal 14 of pick-up secondary 11. Arm 27 is adjusted so that its potential is the same as that of the junction 22 of rectifiers 21.

When core 3 is unaffected by external magnetic fields, it will be symmerically and periodically magnetized in opposite directions by the alternating current in the primary windings 5, 7, the current magnitude being adjusted to operate the core with varying permeability and reluctance. If the core is subjected to an external magnetic field, for instance the earth's field, then, as the primary current passes through zero, there will be a time displacement of the point of zero magnetism. There will be a resulting time interval between the instants that the right and left portions of the core pass through zero magnetism. This time interval will increase as the strength of the external field is increased.

This effect produces an alternating voltage in the secondary winding 11 having a component of double the frequency of the primary current. Reversal of the direction of the external magnetic field will produce phase reversal of the secondary voltage.

In other words, the exciting coils 5 and 7, when energized from a suitable source of alternating or pulsating current, will produce periodically varying fluxes in the core 3 of permeable magnetic material. The number of ampere turns will determine the degree of saturation produced in the core or the zone of operation of the core along its magnetization curve. Therefore, the amount of current supplied to these exciting windings or coils having a given number of turns will determine the desired degree of saturation of the core. The periodically varying fluxes produced in the core by the coils 5 and 7 will be in bucking relationship due to the arrangement of these coils and if the secondary or pick-up winding 11 is properly adjusted in symmetrical relation to these fluxes, no voltage of fundamental frequency or of the frequency of the source of energy used in exciting the core will appear in the pick-up winding. In this invention, it will be observed that the coil 11 may be adjusted axially of the core 3 to effectively balance out this fundamental frequency voltage. However, when the core is subjected to an external unidirectional field, unidirectional fluxes are induced in the core 3 thereby rendering the wave form of the voltage induced in let us say one pick-up winding of an unsymmetrical character. This is due to the fact that a double frequency component is present in the induced voltage and it is the double frequency component, the fundamental being bucked out, which is supplied to the indicating means as a measure of the strength of the unidirectional field along the longitudinal axis of the core.

Meter 19 is of the direct current zero-center type and is used to indicate the direction and intensity of the external field. For this purpose, rectifiers 21 are used to block off the current of secondary winding 11 during half-cycles of the supply voltage fed from winding 23 having a given polarity and to permit passage of secondary current only during the half-cycles of opposite polarity.

Thus, let it be assumed that rectifiers 21 will conduct only when their upper terminals are positive with respect to their lower terminals. During the half-cycle of voltage from supply secondary 23 that these rectifiers are conducting, a current from secondary 11 will flow through meter 19 and through one or the other of the rectifiers, depending on the polarity of this current from winding 11. It will produce deflection of the indicator of meter 19 in a direction corresponding to its polarity. During the succeeding half-cycle of supply voltage from winding 23, both rectifiers 21 are maintained non-conductive by the voltage of winding 23, since this voltage is much larger than the voltage across secondary winding 11, so that no current can flow through the meter 19. The meter 19 is thereby supplied with current of predominantly one polarity and that polarity corresponds to the relative direction of the external magnetic field (right or left) with respect to the axis of core 3. Since the intensity of the external field determines the voltage picked up by secondary 11, meter 19 may be calibrated in magnetic field units to read directly the intensity and polarity of the component of the external magnetic field along the axis of core 3.

If the only external field is the earth's field, this device will indicate the component of the earth's field along the axis of core 3. Meter 19 may be calibrated directly in degrees of magnetic bearing, permitting the use of the device as a magnetic compass.

It is found that the absolute magnitude of the output voltage from secondary winding 11 depends upon the relative phase of the current in the primary coils with respect to the voltage across rectifiers 21. A condenser 20 is therefore used to adjust this phase relation to an optimum value. This condenser may be variable, and is adjusted by noting maximum indication on meter 19 for a given external field.

It is not necessary to use center-tapped resistor 25. The connection to point 27 may be made directly to a center-tap on secondary winding 23. Also, the two separate secondary windings 23 and 13 may be combined into one, with the energizing circuit for coils 5, 7 and the rectifier circuit connected in parallel thereto. Furthermore, the present connection to point 27 may be made to the junction 9 of coils 5 and 7, thereby reducing the number of wires to the pick-up unit 1, which may be, and usually is, located at a distance from the indicator meter 19.

Fig. 2 shows a modification of the device of Fig. 1. Here the pick-up unit primary windings 5, 7 are energized from a two-pole alternator 29 driven at constant speed by motor 31. Switching is effected by commutator 33, which has two fixed 90° segments 35, 37 and a movable shorting arm 39 rotated by motor 31 in synchronism with alternator 29. Arm 39 connects segments 35, 37 for 90 degrees of rotation of alternator 29, opens the circuit for the succeeding 90 degrees, and repeats this cycle. Since alternator 29 will generate one cycle per revolution, commutator 33, which is connected in series with secondary winding 11 and zero center meter 19, will close the secondary circuit for alternate quarter cycles of the primary current, which correspond to alternate half-cycles of secondary current, which has a frequency double that of the primary current. By properly phasing the commutating action with respect to the alternator voltage output, as by shifting arm 39 relative to shaft 43, the commutator 33 is adjusted to effect mechanical rectification of the secondary current, and direct current meter 19 will indicate the sense of the deviation of the coil axis from the axis of the external field, by its right or left deflection, and the amount of such deviation, by the amount of deflection.

It is obvious that the primary coils 5, 7 of Fig. 2 might as well be energized from any source of periodically varying current, so long as the commutator 33 is properly synchronized with the frequency of the source, so as to provide proper interruption and phase-sensitive rectification of the secondary current.

Fig. 3 shows a pulsating current supplied to primary windings 5, 7 by means of vibrator 45 having coil 47 and armature 49. Current from battery 55 energizes coil 47 and draws up armature 49 against the opposition of spring 57. Contacts 51 are thereby closed and short circuit coil 47, permitting spring 57 to withdraw armature 49, and open contacts 51, whereupon the cycle of operations is repeated.

Contacts 53 are opened and closed in synchronism with the operation of armature 49, and serve to open or close the circuit of meter 19.

The pulsating current supplied to primary coils 5, 7 creates a double frequency current in secondary 11, in the presence of an external magnetic field, as in Figs. 1 and 2. The secondary current is connected to meter 19, in series with interrupter contacts 53, an amplifier 59 being inserted if necessary.

The phase of the primary current pulsations relative to the interruption of contacts 51 is adjusted by adjusting the capacitance of condenser 61, to yield maximum secondary current for fixed external field. Once adjusted, condenser 61 remains fixed in value. Condenser 63 minimizes sparking at contacts 53.

Meter 19 will then give right or left indications according to the sense of the external field, and in amount according to the intensity of the external field component along the axis of the coil. Amplifier 59 can be biased in known ways to prevent any output until a certain predetermined input level is attained. In this way undesirable small random fluctuations have no effect on meter 19.

Fig. 4 shows a further modification of the devices of Figs. 1 to 3, used as a magnetic field indicator. In this figure, the output of secondary winding 11 is fed to an amplifier 59, whose output energizes the coil of relay 65. The contacts of relay 65 may control any type of outside indicator or control circuit. This device will respond to the approach or passage of iron or magnetic bodies, such as automobiles, trains, or parts on a conveyor. The relay output may operate stop lights on a highway, or a counter. The sensitivity of the device can readily be adjusted so as not to respond to a disturbance below a certain minimum value, and to record a strong signal as soon as the disturbance exceeds this minimum, as by proper bias on the input of amplifier 59.

Fig. 5 shows a further modification of Figs. 1 to 3. Here the voltage across the secondary winding 11 may be tuned to double the supply frequency as by condenser 67. The secondary winding 11 may be as tuned in any of the modifications of this invention. This secondary voltage is then applied to the control grids of twin triode 69 by way of center-tapped input resistor 71 whose center-tap is connected to the cathodes of tube 69. The anodes of tube 69 are energized with pulsating voltage from secondary winding 23 by way of rectifier bridge 73 and equal load resistors 75. Preferably, the double frequency, alternating current ripple from the rectifier 73 is used as the plate potential for the plates or anodes of tube 69. Meter 77 is connected across resistors 75, as shown. With zero voltage input, both sections of tube 69 are adjusted to take equal plate current, so that zero voltage will appear across meter 77. When secondary 11 produces voltage, it will act differentially on the two sections of tube 69, resulting in a net voltage across meter 77, whose polarity depends on the phase of the input voltage from secondary winding 11. Tube 69 acts as a phase discriminating device as well as an amplifier. The indication on meter 77 will then indicate both magnitude and direction of the external field.

It is obvious that a duplex tube need not be used, as two separate tubes would perform in the same way. Also rectifier 73 may be omitted and the anodes energized directly from secondary 23 of supply transformer 15. A center-tapped choke coil may be used in place of resistor 71. A suitable bias may be inserted between the cathodes of tube 69 and the center-tap of resistor 71, or its choke equivalent if it is desired to make the device responsive only above a predetermined signal level.

Fig. 6 shows another modification of the device in which all switching means are eliminated. Motor 31 drives two-pole alternator 29 and four-pole alternator 129. The voltage generated by the two-pole alternator energizes primary windings 5, 7. The double frequency output from secondary coil 11 is fed to one coil, for example the moving coil 79, of dynamometer-type meter 81, whose second, or fixed winding 83 is energized from the double frequency output of four-pole alternator 129. Meter 81 will indicate the relative magnitude of the output voltages from alternator 129 and secondary winding 11. Also, the meter indication will reverse direction when the phase of the voltage output from secondary winding 11 reverses.

The phase relation between the outputs of the two alternators is adjusted, either by adjusting their relative armature positions or by inserting an adjustable condenser in circuit with one of them, to give a maximum deflection on meter 81 for fixed position of the core 3 and fixed magnitude of external field.

Fig. 7 shows an adaptation of the special transformer of Figs. 1 to 6 for use as an instrument for measuring the magneto-motive force and intensity of an external field. In addition to windings 5, 7, 11 on core 3, an additional winding 85 is placed symmetrically with respect to the remaining windings. An adjustable amount of direct current is passed through this winding 85 from battery 93, the polarity and magnitude of the current being adjusted by potentiometer 91, and indicated on direct current meter 89. Coils 5, 7 are provided with periodically varying current from source 17 as in the other modifications. With zero direct current in coil 85, alternating current meter 87 will yield an indication of any external field. Potentiometer 91 is then adjusted until meter 87 registers zero value. Then it will be clear that the external field is exactly balanced by the field produced by current in coil 85. Knowing the number of turns in coil 85, and reading the current on meter 89 will give immediately the magnetomotive force (ampere-turns) corresponding to the external field. This is also an indication of the external field strength and meter 89 may be calibrated to read field strength at once. The polarity of current registered by meter 89 will also indicate the direction of the external field.

Of course, any of the indicating systems shown in Figs. 1 to 6 may be used in place of meter 87.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A device as in claim 9, in which said indicating means includes an indicator and means for rendering said indicator ineffective during alternate half-cycles of said periodically varying magnetomotive forces.

2. A device as in claim 9, in which said indicating means includes an indicator, and means synchronized with said varying magnetomotive forces for rendering said indicator ineffective during alternate half-cyles of said varying magnetomotive forces.

3. A magnetic field responsive device comprising a core of magnetic, permeable material, means including a source of periodically varying electrical energy for producing periodically varying fluxes in a zone of said core and in opposed bucking relationship, a pick-up coil associated with said zone of the core and symmetrically positioned with respect to said fluxes, means for indicating the output from said coil, and phase-sensitive means connected with said energy source for supplying a unidirectional current from said coil-output to said indicating means.

4. A magnetic field responsive device comprising a core of magnetic, permeable material, means including a source of periodically varying electrical energy for producing periodically varying fluxes in a zone of said core and in opposed bucking relationship, a pick-up coil associated with said zone of the core and symmetrically positioned with respect to said fluxes, means for indicating the output from said coil, electron tube means connected to receive the output of said coil and to supply current to said indicating means, and means for supplying a potential to the plate of said tube means of a frequency substantially twice that of said source.

5. In a device sensitive to an external, unidirectional magnetic field for supplying a signal voltage output dependent in magnitude upon the direction of said field relative thereto, a core of permeable magnetic material, a pair of exciting coils surrounding said core, a source of periodically varying electrical energy of fundamental frequency for said coils, said coils being arranged to produce opposed and bucking exciting fluxes in said core, a pick-up coil associated with said core and so positioned as substantially to buck out any voltages induced therein by said exciting fluxes but to supply a double frequency voltage output through interaction with the external field, means for indicating the output from said coil, and means controlled by said energy source for subjecting said indicating means to unidirectional current from said pick-up coil.

6. In a device sensitive to an external, unidirectional magnetic field for supplying a signal voltage output dependent in magnitude upon the direction of said field relative thereto, a core of magnetic, permeable material, means including a source of periodically varying electrical energy for producing periodically varying fluxes in a zone of said core and in opposed bucking relationship, a pick-up coil associated with said zone of the core and symmetrically positioned with respect to said fluxes, a zero-center reading meter for indicating the magnitude and direction of the output of said pick-up coil, and means controlled by said energy source for subjecting said meter to unidirectional current from said pick-up coil, the direction of said current being dependent upon the phase relationship of the pick-up coil output with respect to said energy source.

7. A device of the character recited in claim 9, in which the indicating means includes an indicator and two series-connected rectifiers energized from said energy source, said indicator and pick-up coil being connected between the junction of said rectifiers and a point whose potential is the mean of the potentials across the energy source for said rectifiers.

8. In a device sensitive to an external, unidirectional magnetic field for supplying a signal voltage output dependent in magnitude upon the direction of said field relative thereto, a core of permeable magnetic material, means including a source of periodically varying electrical energy for producing periodically varying fluxes in a zone of said core and in opposed bucking relationship, a pick-up coil associated with said core in said zone thereof and positioned in symmetrical relation to said bucking fluxes, interaction between said device and said external field producing a periodically varying voltage in said pick-up coil, and means for rectifying the output of said coil, said rectifying means being connected to and controlled by said energy source whereby to render the polarity sense of the rectified coil output dependent upon the phase relationship of the coil output with respect to said energy source.

9. In a device sensitive to an external, unidirectional magnetic field for supplying a signal voltage output dependent in magnitude upon the direction of said field relative thereto, a core of permeable magnetic material, means including a source of periodically varying electrical energy for producing periodically varying fluxes in a zone of said core and in opposed bucking relationship, a pick-up coil associated with said core in said zone thereof and positioned in symmetrical relation to said bucking fluxes, interaction between said device and said external field producing a periodically varying voltage in said pick-up coil, means for rectifying the output of said coil, and indicating means connected to said rectifier means for indicating the relative phase and magnitude of the coil output, said rectifying means being connected to and controlled by said energy source whereby to provide said indicating means with phase sensitive indications.

10. In a device sensitive to an external, unidirectional magnetic field for supplying a signal voltage output dependent in magnitude upon the direction of said field relative thereto, a core of permeable magnetic material, means including a source of periodically varying electrical energy for producing periodically varying fluxes in a zone of said core and in opposed bucking relationship, a pick-up coil associated with said core in said zone thereof and positioned in symmetrical relation to said bucking fluxes, interaction between said device and said external field producing a periodically varying voltage in said pick-up coil, electron tube means having a control electrode thereof connected to receive the output of said coil, and means for supplying a potential to the plate of said tube means of substantially the same frequency as the frequency of the voltage applied to the control electrode thereof.

11. A magnetic field responsive device comprising a core of magnetic, permeable material, means including a source of periodically varying electrical energy for producing periodically varying fluxes in a zone of said core and in opposed bucking relationship, a pick-up coil associated with said zone of the core and symmetrically positioned with respect to said fluxes, means for indicating the output from said coil, electron tube means connected to receive the output of said coil and to supply current to said indicating means, and frequency doubling means connected with said energy source for supplying a reference potential to the plate of said tube.

12. A device of the character recited in claim 11 in which the frequency doubling means comprises a rectifier.

13. In a compass device sensitive to an external, unidirectional magnetic field for supplying a signal voltage output dependent in magnitude upon the direction of said field relative thereto, a core of magnetic permeable material, means including a source of periodically varying electrical energy for producing periodically varying fluxes in a zone of said core and in opposed bucking relationship, a pick-up coil associated with said core in said zone thereof and positioned in symmetrical relation to said bucking fluxes, interaction between said device and said external field producing a periodically varying voltage in said pick-up coil, and means controlled by said energy source for rectifying the output of said pick-up coil.

LENNOX F. BEACH.